United States Patent
Park

(10) Patent No.: US 8,305,479 B2
(45) Date of Patent: Nov. 6, 2012

(54) FAST AND LOW-POWER DIGITAL CAMERA WITH GPS

(75) Inventor: Sung Park, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 12/417,986

(22) Filed: Apr. 3, 2009

(65) Prior Publication Data

US 2009/0251558 A1  Oct. 8, 2009

(30) Foreign Application Priority Data

Apr. 4, 2008 (KR) .................. 10-2008-0031707

(51) Int. Cl.
*H04N 5/222* (2006.01)
*H04N 9/04* (2006.01)

(52) U.S. Cl. ................. 348/333.13; 348/207.99

(58) Field of Classification Search ............... 348/222.1, 348/333.13; 342/352; 455/13.4, 574
See application file for complete search history.

(56) References Cited

U.S. PATENT DOCUMENTS

| | | | |
|---|---|---|---|
| 6,995,792 B1* | 2/2006 | Ogura | 348/231.99 |
| 7,333,054 B2* | 2/2008 | Ueno et al. | 342/357.74 |
| 2006/0176369 A1* | 8/2006 | Meritt | 348/143 |
| 2007/0263981 A1* | 11/2007 | Ueno et al. | 386/83 |
| 2009/0073300 A1* | 3/2009 | Chung | 348/333.01 |

* cited by examiner

*Primary Examiner* — Trung Diep

(74) *Attorney, Agent, or Firm* — Drinker Biddle & Reath LLP

(57) ABSTRACT

Provided are a digital camera having a global positioning system (GPS) and a method of controlling the same. The digital camera comprises a camera body, a digital signal processor, and a GPS receiving module. In the digital camera and method, GPS information regarding a photographing location is stored so as to be attached to a captured image, and particularly, power supplied to the GPS is adaptively controlled for lower power consumption.

18 Claims, 11 Drawing Sheets

(d)

(e)

FAST AND LOW-POWER DIGITAL CAMERA WITH GPS

CROSS-REFERENCE TO RELATED PATENT APPLICATIONS

This application claims the benefit of Korean Patent Application No. 10-2008-0031707, filed on Apr. 4, 2008, in the Korean Intellectual Property Office, the disclosure of which is incorporated herein in its entirety by reference.

BACKGROUND OF THE INVENTION

1. Field of the Invention

The present invention relates to a digital camera having a global positioning system (GPS) and a method and apparatus for controlling the same. More particularly, the present invention relates to a digital camera capable of storing GPS information about the photographing location for attachment to a captured image, and of adaptively controlling supply of power to a GPS for fast operation and low power consumption.

2. Description of the Related Art

As digital cameras and mobile devices with built-in cameras have rapidly become widespread, it has become typical to capture a digital image by simple manipulation of such devices. Thus, a user would find it difficult to remember where each of a plurality of photographs stored in a memory. For this reason, there is a growing need to provide a captured image together with the location information thereof in order to help the user remember.

Conventionally, global positioning systems (GPSs) providing location information have been developed and commercialized. In general, a GPS continuously receives a satellite signal from a satellite in orbit and arithmetically processes the received signal. Thus, in an environment that does not require continuous location tracking but intermittently requires location information for photographing, it is necessary to adaptively control a supply of power to a GPS. In general, mobile devices have a limited battery capacity as a power source. Mobile devices therefore need to be designed to minimize consumption of overall power as well as consumption of power in a GPS. In particular, recently developed multi-functional convergent digital cameras not only have a main function of photographing a subject but also support various multimedia content, such as MP3, portable media player (PMP), and voice recording. Since a GPS preferably should not operate during reproduction of multimedia content, development of a method of optimizing control of a supply of power to a convergent digital camera is needed.

SUMMARY OF THE INVENTION

The present device provides a digital camera capable of storing global positioning system (GPS) information regarding a photographing location to be attached to a captured image and adaptively controlling supply of power to a GPS thus realizing low-power consumption, and a method of controlling the same.

According to an aspect of the present invention, there is provided a digital camera including a camera body, a digital signal processor, and a GPS receiving module. The camera body includes an optical unit and a user input unit, and supplies an input signal and an image of a subject to the digital signal processor. The digital signal processor, in turn, produces a photographing signal for the GPS receiving module and controls or limits power to the GPS receiving module based on the input signal. The GPS receiving module supplies GPS location information to the digital signal processor. The input signal is processed by counting the number of manipulation (i.e., the number of times that a user manipulates the user input unit as determined by a measurement of the input signal).

In an embodiment, the digital signal processor has at least three different modes of operation for limiting power to the GPS receiving module. In the power control operations, time intervals at which power supply to the GPS receiving module resumes are set to be short enough to perform the hot booting in some embodiments.

The GPS receiving module further comprises a memory for storing received navigation data, and reduces a standby period of time to receive navigation data by loading last received navigation data when power supply is resumed. The GPS receiving module boots by one of hot booting, warm booting, and cold booting according to the amount of time that lapses after navigation data is last received.

If the memory of the present invention is a volatile memory in which recorded information is lost when power supply is discontinued, power supply is maintained regardless of GPS power control.

In an embodiment, a $0^{th}$ power control operation is performed on the GPS receiving module in the shooting mode, a $1^{st}$ power control operation is performed on the GPS receiving module in an operating mode requiring that the number of manipulation be '1', and a $2^{nd}$ power control operation is performed on the GPS receiving module in an operating mode requiring that the number of manipulation be '2'.

The GPS receiving module may be maintained in a power-on state in the $0^{th}$ power control operation, and the GPS receiving module may be alternately powered on and off in the $1^{st}$ and $2^{nd}$ power control operations, where the relationship between time intervals T1 and T2 at which power supply is respectively resumed in the $1^{st}$ and $2^{nd}$ power control operations may satisfy T1<T2.

On the GPS receiving module, a $0^{th}$ power control operation may be performed in the shooting mode, a $1^{st}$ power control operation may be performed in an operating mode requiring that the number of manipulation be '1', a $2^{nd}$ power control operation may be performed in an operating mode requiring that the number of manipulation be '2', and a $3^{rd}$ power control operation may be performed in an operating mode requiring that the number of manipulation be '3'.

The GPS receiving module may be maintained in a power-on state in the $0^{th}$ power control operation, and the GPS receiving module may be alternately powered on and off in the $1^{st}$ through $3^{rd}$ power control operations, where the relationship between time intervals T1, T2 and T3 at which power supply is respectively resumed in the $1^{st}$ through $3^{rd}$ power control operations may satisfy T1<T2<T3.

The GPS receiving module may include a memory storing received navigation data, and reduce a standby period of time to receive navigation data by loading last received navigation data when power supply is resumed. The GPS receiving module may be booting by one of hot booting, warm booting, and cold booting according to the amount of time that lapses after navigation data is last received.

In the power control operations, time intervals at which power supply to the GPS receiving module resumes may be set to be short enough to perform the hot booting.

If the memory is a volatile memory in which recorded information is lost when power supply is discontinued, power supply may be maintained regardless of GPS power control.

The number of manipulation may be obtained by referring to a data table recording the relationships between an individual operating mode and the number of manipulation.

A manipulation necessary to change the state of the camera may be counted as the number of manipulation, and manipulation of directional buttons may not be counted.

According to another aspect of the present invention, there is provided a method of controlling a digital camera including a camera body capturing an image of a subject and a GPS (global positioning system) receiving unit calculating GPS information regarding a photographing location in response to a photographing signal from the camera body, the method including checking a current operating mode executed in the camera body; detecting a minimum number of manipulation necessary for entering a shooting mode from the current operating mode; and performing multi-stage power control operations on the GPS receiving module according to the number of manipulation.

On the GPS receiving module, a $0^{th}$ power control operation may be performed in the shooting mode, a $1^{st}$ power control operation may be performed in an operating mode requiring that the number of manipulation be '1', and a $2^{nd}$ power control operation may be performed in an operating mode requiring that the number of manipulation be '2'.

On the GPS receiving module, a $0^{th}$ power control operation may be performed in the shooting mode, a $1^{st}$ power control operation may be performed in an operating mode requiring that the number of manipulation be '1', a $2^{nd}$ power control operation may be performed in an operating mode requiring that the number of manipulation be '2', and a $3^{rd}$ power control operation may be performed in an operating mode requiring that the number of manipulation be '3'.

The operating mode requiring that the number of manipulation be '1' may include an MP3 playback mode and a mode change mode, the operating mode requiring that the number of manipulation be '2' may include an MP3 power-saving mode, and the operating mode requiring that the number of manipulation be '3' may include a PMP (personal multimedia player) playback mode and power-off state of the camera body.

The GPS receiving module may be maintained in a power-on state in the $0^{th}$ power control operation, and the GPS receiving module may be alternately powered on and off in the $1^{st}$ through $3^{rd}$ power control operations, where the relationship between time intervals T1, T2 and T3 at which power supply is respectively resumed in the $1^{st}$ through $3^{rd}$ power control operations may satisfy T1<T2<T3.

The GPS receiving module may include a memory storing received navigation data, and reduce a standby period of time to receive navigation data by loading last received navigation data when power supply is resumed. The GPS receiving module may be booting by one of hot booting, warm booting, and cold booting according to the amount of time that lapses after navigation data is lastly received.

In the power control operations, time intervals at which power supply to the GPS receiving module resumes may be set to be short enough to perform the hot booting.

The detecting of a minimum number of manipulation necessary may include referring to a data table recording the relationships between an individual operating mode and the number of manipulation.

A manipulation necessary to change the state of the camera may be counted as the number of manipulation, and manipulation of directional buttons may not be counted.

BRIEF DESCRIPTION OF THE DRAWINGS

The above and other features and advantages of the present device will become more apparent from a detailed description of exemplary embodiments thereof with reference to the attached drawings in which.

DETAILED DESCRIPTION OF THE INVENTION

Hereinafter, exemplary embodiments of a digital camera and a method of controlling the same according to the present invention will be described in detail with reference to the accompanying drawings. In the present specification, the term, 'digital camera' refers to various types of mobile electronic devices designed to have a photographing function and to be appropriate for a mobile environment so that a user can carry them. That is, the term, 'digital camera' must not be simply understood as cameras in a narrow sense, which are categorized according to shape, but must be understood as mobile devices in a broader sense, such as mobile phones and personal digital assistants (operation PDAs), having portability and a photographing function. Also, a digital camera according to an embodiment of the present invention not only has a main function of capturing an image of a subject but also supports various multimedia content. More specifically, the digital camera according to an embodiment of the present invention may be a convergent digital camera supporting various multimedia content, such as MP3, portable media player (PMP), digital multimedia broadcasting (DMB), voice recording, and a text viewer.

Figure 1:
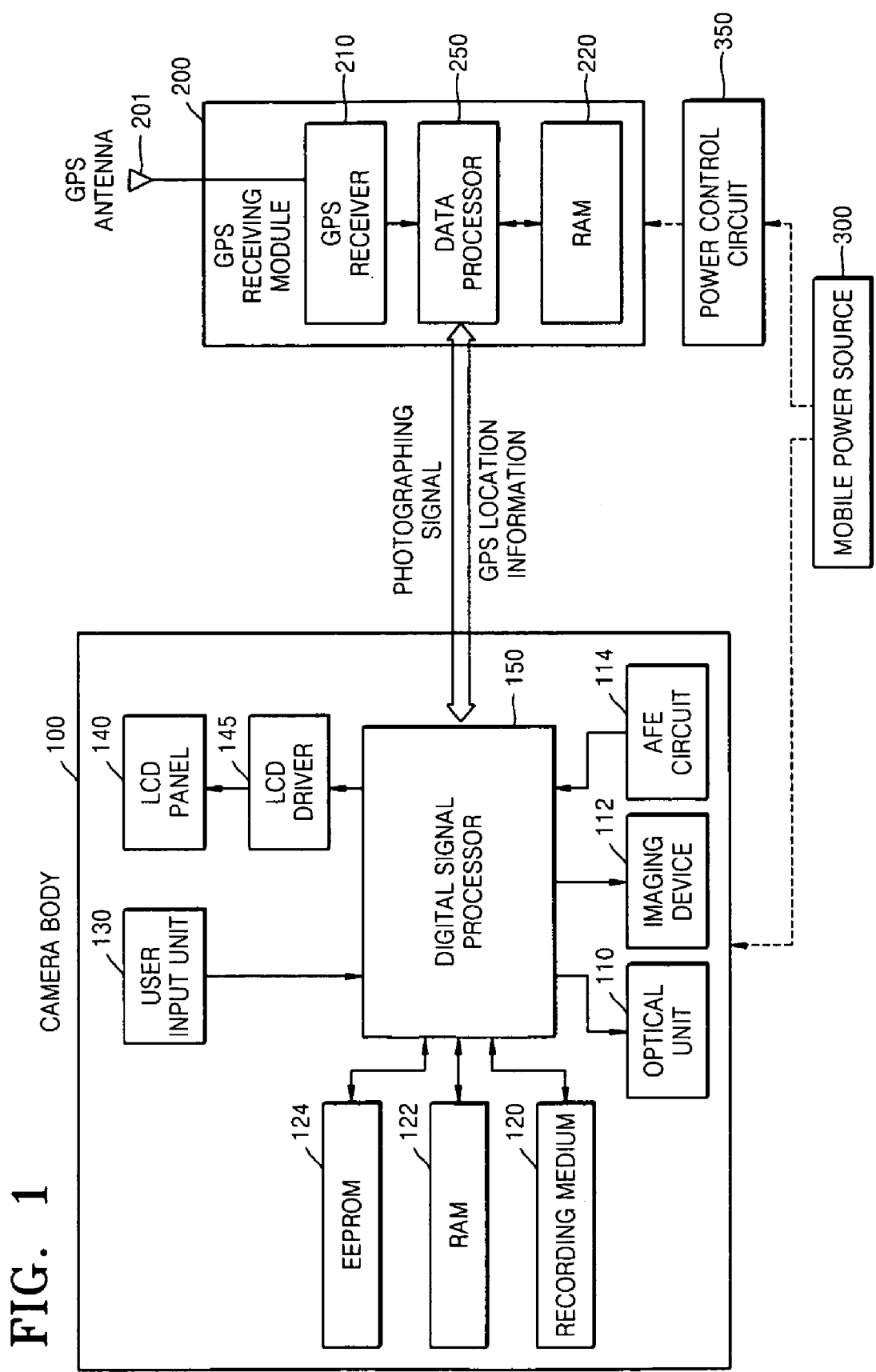
FIG. 1 is a block diagram schematically illustrating a digital camera having a global positioning system (GPS) according to an embodiment of the present invention.

FIG. 1 is a block diagram schematically illustrating a digital camera having a global positioning system (GPS) according to an embodiment of the present invention. Referring to FIG. 1, the digital camera includes a camera body 100 for photographing an image of a subject, and a GPS receiving module 200 for calculating global positioning system (GPS) information regarding a photographing location while being associated with the camera body 100. The camera body 100 includes an optical unit 110 having a plurality of optical lenses for focusing an image of a subject on an imaging surface, an imaging device 112 for transforming the image of the subject passing through the optical unit 110 into an electrical image signal, and an analog front-end (AFE) circuit 114 transforming an output signal of the imaging device 112 into a quantized digital image signal. The camera body 100 also includes, as storage devices, a random access memory (RAM) (dynamic RAM (DRAM) or synchronous DRAM (SDRAM)) 122 for temporarily storing an image signal for signal processing, a recording medium 120 for storing image data of a subject in the form of an image file, a digital signal processor 150 for controlling overall flow of data and the overall operations of the other elements, and an electrically erasable programmable read-only memory (EEPROM) 124 for storing an algorithm and setup data necessary to operate the digital signal processor 150. The camera body 100 also includes a liquid crystal display (LCD) 140 as a display device for displaying an image signal received from an LCD driver 145, and a user input device 130 as an input device.

Figure 2:
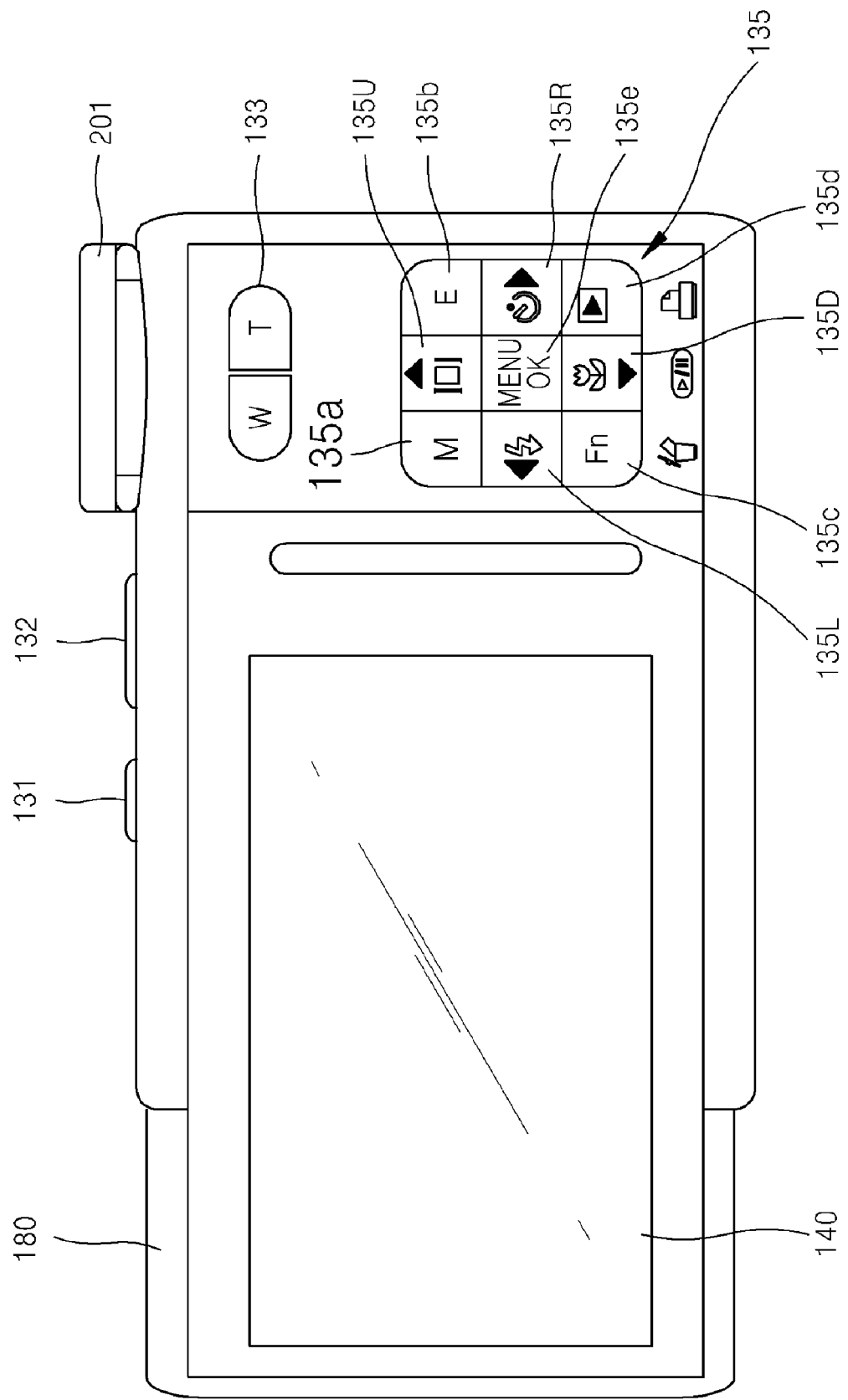
FIG. 2 is a view of a rear surface of a digital camera according to an embodiment of the present invention.

FIG. 2 is a view of a rear surface of a digital camera according to an embodiment of the present invention. Referring to FIG. 2, an LCD panel 140 is disposed on a rear surface of a camera case 180. The LCD panel 140 performs a display according to an image signal received from the digital signal processor 150 of FIG. 1. For example, a live view screen presenting an image of a current subject is displayed in a shooting mode, an MP3 playback screen that is input beforehand is displayed in an MP3 mode, and a playback screen is displayed using a stored moving picture file in a PMP mode. Also, when changing modes, a menu screen for mode selection is displayed and various menu screens scrolled from an upper layer to a lower layer according to user manipulation are provided, thereby supporting an on-screen display (OSD).

A plurality of user input devices constituting the user input unit 130 of FIG. 1 are arranged around the LCD panel 140. For example, a power button 131 and a shutter button 132 may be placed on the top of the case 180, and a Wide/Tele (W/T) button 133 may be placed at an upper part of the rear surface of the case 180. Beside the LCD panel 140, a 9-grid (a 3×3 grid) button 135 with a plurality of buttons arranged in a matrix may be placed. The 9-grid button 135 may include a 'menu OK' button 135e at its center, and a plurality of directional buttons, e.g., a 'right' button 135R, a 'left' button 135L, an 'up' button 135U, and a 'down' button 135D, and a plurality of function buttons, e.g., a menu button 135a, an effect button 135b, a function button 135c, and a playback button 135d, which are arranged to encircle the 'menu OK' button 135e. The 'menu OK' button 135e may be used to select a menu item indicated with a cursor on a screen. The directional buttons 135R, 135L, 135U, and 135D may be used to adjust the location of the cursor on the screen. The menu button 135a, the effect button 135b, the function button 135c, or the playback button 135d may be used to call a user setting mode, such as a menu mode, an effect mode, a function mode, or a playback mode. For example, a GPS antenna 201 having a hinge structure is placed on the top of the case 180 to be folded and unfolded upward in order to increase the sensitivity of reception.

As illustrated in FIG. 1, the GPS receiving module 200 includes a GPS receiver 210 connected to the GPS antenna 201 via which a satellite signal is received, a data processor 250 calculating GPS location information from the satellite signal, and a RAM (DRAM or SDRAM) 220 temporarily storing the calculated GPS location information. The GPS receiver 210 performs satellite pickup in order to receive navigation data including satellite location information and time information from at least three satellites having different orbits to each other. The data processor 250 calculates the distance to a satellite from the time interval between when the satellite signal was generated and when this signal was received, and performs an operation of determining the latitude and longitude coordinates by applying triangulation. The navigation data received from the GPS receiver 210 and/or GPS location information received from the data processor 250 is temporarily stored in a memory, such as the RAM 220, and may be updated with the latest information. A standby time incurred for satellite pickup may be effectively shortened by loading navigation data that was previously received and stored in the RAM 220, and estimating the current location of a satellite.

The camera body 100 and the GPS receiving module 200 are supplied power from a mobile power source 300 such as a battery. A power control circuit 350 may be interposed between the GPS receiving module 200 and the mobile power source 300 in order to switch the power supply on or off. The power control circuit 350 controls the on/off switching of the power supply from the mobile power source 300, in response to a power control signal received from the digital signal processor 150. The digital signal processor 150 (or a GPS control algorithm executed in the digital signal processor 150) adaptively controls supply of power to the GPS receiving module 200 according to the current operating state of the digital camera, thereby minimizing power consumption of the mobile power source 300 which has limited capacity.

The camera body 100 and the GPS receiving module 200 are linked to each other. According to user manipulation of the shutter button 132, the camera body 100 captures an image of a subject, and the GPS receiving module 200 calculates GPS location information regarding the photographing location and the GPS location information may be attached to the captured image in the recording medium 120. The overall operation of the GPS receiving module 200 may be controlled according to the GPS control algorithm executed in the digital signal processor 150. However, an additional microprocessor (not shown) that has an arithmetic function and can execute a control algorithm may be installed in the digital camera in order to reduce the load on the digital signal processor 150 and replace the control operation of the digital signal processor 150.

In general GPS management, a driving power is continuously supplied to a GPS in order to periodically receive navigation data from a satellite in orbit, continuously perform location measurement, and update location information in real time. For low power consumption, in an embodiment of the present invention, the on/off switching of the power supplied to the GPS receiving module 200 is controlled according to the operating state of the digital camera (camera body 100), thereby preventing power from being consumed in order to continuously update location information being not closely related to the photographing location. However, in the case of a GPS that alternately operates/stops when a power source is switched on/off, initialization to newly search for a satellite in orbit is performed whenever starting the GPS, and thus, a standby time necessary to receive a satellite signal may increase.

In determining a precise photographing location, GPS location information must be rapidly calculated in response to a user's manipulation of a shutter. The time required for satellite pickup (namely, first fix time (FFT)), must be minimized. To reduce FFT, the current location of the satellite is estimated by loading navigation data that was previously received and stored in the RAM 220. The GPS preferably operates in such a manner that satellite pickup can be quickly performed. To this end, there are various booting modes that are adaptively applied according to a circumstance when starting the GPS. In detail, the following various booting modes may be applied depending on whether previously stored navigation data exists and the time interval between last navigation data is received and when the GPS is currently started. For example, the following GPS booting modes may be performed by the GPS control algorithm executed by the digital signal processor 150.

Booting Modes of GPS Receiving Module

1. Hot Booting: In a hot booting mode, a satellite in orbit can be picked up quickly by loading navigation data stored in the RAM 220. This mode can be applied within a short time (e.g., about several tens of minutes), after last navigation data is received. This mode is the fastest booting mode since a fast fix time (FFT) is only several seconds. Thus, satellite pickup using hot booting may fail when trying to receive a satellite signal at long time intervals exceeding several tens of minutes.

2. Warm Booting: A warm booting mode can be used when exceeding a short time (e.g., about several tens of minutes), appropriate for hot booting or when hot booting is tried but satellite signal reception fails. In this mode, a satellite in orbit can be quickly searched for by loading previous data stored in the RAM 220. This mode can be applied approximately 2 to 4 hours after navigation data is last received, and the FFT is about 10 to 30 seconds.

3. Cold Booting: A cold booting mode is an initialization mode applied when no data is stored in a memory or when warm booting is tried but receiving of a satellite signal fails. In this mode, previously received data is disregarded and a satellite in orbit is newly searched for. Assuming that about 15 seconds is necessary to search for each satellite, this mode is the slowest booting mode since the FFT can be up to 40 seconds.

As described above, a booting mode of the GPS receiving module 200 may be determined by the amount of time that lapses after receiving of navigation data is completed. However, GPS booting may be actually performed in the order of hot booting, warm booting, and cold booting in consideration of booting speed without performing an additional determination process. If satellite pickup fails, a current booting mode may be switched to a next booting mode (i.e., a booting mode increasing in delay compared to the current booting mode). In this regard, the amount of time that lapses after data is received is just a matter for reference when determining a booting mode, rather than a determinant.

Figure 3:
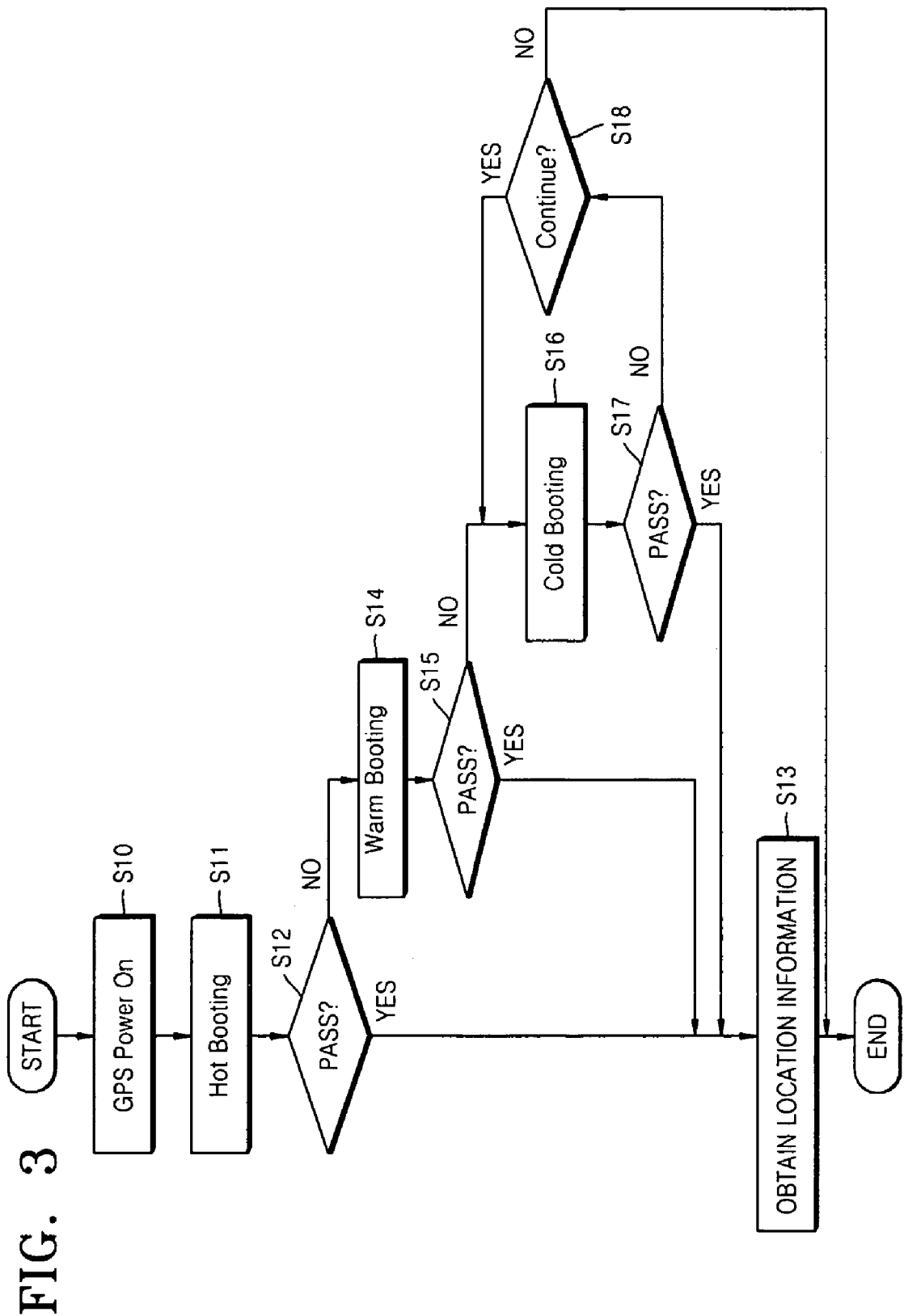
FIG. 3 is a flowchart illustrating a method of booting a GPS receiving module according to an embodiment of the present invention.

FIG. 3 is a flowchart illustrating a method of booting the GPS receiving module 200 of FIG. 1 according to an embodiment of the present invention. As illustrated in FIG. 3, when driving power is supplied to the GPS receiving module 200 (operation S10), hot booting that requires a shortest standby time is tried (operation S11). In this case, whether satellite signal reception according to hot booting succeeds is determined (operation S12). If it is determined in operation S12 that a satellite signal is received, a process of obtaining location information is directly performed (operation S13). If it is determined in operation S12 that a satellite signal is not received, a next booting mode that causes more delay than hot booting, i.e., warm booting, is tried (operation S14). Then, whether satellite signal reception by using warm booting succeeds is determined (operation S15). If it is determined in operation S15 that a satellite signal is received, the process of obtaining location information is performed (operation S13). If it is determined in operation S15 that a satellite signal is not received, a next booting mode that causes the most delay, i.e., cold booting, is tried (operation S16). Next, depending on whether satellite signal reception by using cold booting succeeds is determined (operation S17), the process of obtaining location information is performed (operation S13) or cold booting is retried after determining whether cold booting is to be repeatedly performed (operation S18).

For low power consumption of a GPS, in an embodiment of the present invention, it is possible to control supply of power to the receiving module 200 so that a power source is periodically, repeatedly switched on/off, without continuously operating the receiving module 200. Also, GPS booting may be performed whenever switching on the GPS to resume supplying power thereto. In this case, the interval between the switching on periods may be set to up to thirty minutes, so that navigation data for hot booting can be continuously retained in order to immediately perform satellite pickup in response to a shooting event. That is, if navigation data received up to thirty minutes before is used, it is possible to receive a satellite signal by applying hot booting. However, as will be described later, the cycle of operating the GPS is not set to be the same unconditionally and may be set to be different for each of various operating modes by monitoring the operating state of the camera body 100 and considering the number of user manipulation necessary for entering a shooting mode from a current operating mode.

In order to acquire location information regarding the photographing location, the GPS receiving module 200 must remain in stand by in preparation for a shooting event so that GPS information regarding the photographing location can be rapidly calculated as soon as a user manipulates a shutter. Also, power supply to the GPS receiving module 200 is controlled based on the number of manipulations needed for entering a shooting mode from a current operating mode, considering that the GPS must be driven at low power consumption in a power-saving mode in a mobile environment that uses the mobile power source 300.

For example, if a current operating mode is either the shooting mode in which a shooting event can be generated as soon as a user manipulates a shutter or a live view mode, a tracking mode may be performed by continuously performing satellite location tracking by periodically receiving navigation data at predetermined time intervals (e.g., 15 second intervals), while continuously operating the GPS receiving module 200. If the current operating mode is another operating mode that requires user manipulation for entering the shooting mode, the GPS receiving module 200 may be powered on/off at appropriate time intervals so that navigation data for hot booting can be retained.

More specifically, the number of user manipulations related to a mode change between a current operating mode and the shooting mode (live view mode) is counted, and the following GPS power control operations are performed. The performing of the GPS power control operations may be performed by the GPS control algorithm executed in the digital signal processor 150.

GPS Power Control Operations

1. $0^{th}$ operation: This operation is performed in the shooting mode (live view mode) allowing a shooting event to be promptly generated. In this operation, the tracking mode is performed to continuously track a satellite by receiving navigation data at predetermined time intervals while the GPS receiving module 200 is maintained in a 'power-on' state (operating state). In the $0^{th}$ power control operation, a GPS is always powered on in order to promptly receive a photographing signal resulting in relatively large power consumption of the GPS. For example, a satellite in orbit is tracked by receiving navigation data from a satellite in orbit at 15 second intervals. Thus, the satellite in orbit can be picked up quickly by using the navigation data when the shooting event occurs, thereby minimizing a delay thereof.

2. $1^{st}$ operation: This operation is performed when a current operating mode is in proximity to the shooting mode based on the number of user manipulations. In detail, this operation is performed when it is possible to directly enter the shooting mode via a single user manipulation. For example, in a mode change screen that waits for user input regarding mode selection, it is possible to directly enter the shooting mode when receiving the single user manipulation for selecting the shooting mode. Also, according to an embodiment of an operating algorithm executed in a digital camera, when a user clicks a certain button once in an MP3 playback screen, the MP3 playback screen is switched to a live view screen, thereby allowing the shooting mode. Accordingly, this operation may be performed during a mode change displaying the mode change screen or during MP3 playback displaying the MP3 playback screen. In the $1^{st}$ power control operation, for low power consumption, the GPS receiving module 200 intermittently operates at predetermined time intervals T1 so that power supply can be alternatively "on/off" on the time axis. However, even if the GPS receiving module 200 is powered off, power supplied to the GPS is not entirely discontinued, and power supplied for retaining previously received and stored navigation data, e.g., power supplied to volatile memory (the RAM 220), is preferably continued. The predetermined time intervals T1 may be appropriately set so that hot booting can be performed in order to minimize power consumption and promptly detect the photographing location. For example, the predetermined time intervals T1 may be 5 minute intervals.

3. $2^{nd}$ operation: This operation is performed when the degree of proximity between a current operating mode and the shooting mode is intermediate based on the number of user manipulation. In detail, this operation may be performed when it is possible to directly enter the shooting mode through a double user manipulation. In general, if a user input is not sensed for a predetermined time during MP3 playback, a power saving mode that switches off a backlight of a playback screen is entered to ensure low power consumption. In this case, the MP3 playback screen is restored when a user clicks a certain button once and the shooting mode is entered when the user clicks a certain button once again. In such an MP3 power saving mode, the shooting mode displaying a live view can be entered through the double user manipulation.

In the $2^{nd}$ power control operation, to ensure low power consumption, the GPS receiving module 200 intermittently operates at predetermined time intervals T2 so that power supply can be alternatively "on/off" on the time axis. The predetermined time T2 intervals is set to be longer than the predetermined time intervals T1, i.e., T2>T1. For example, the predetermined time intervals T2 may be approximately 10 minute intervals.

4. $3^{rd}$ operation: This operation is performed when a current operating mode is relatively distant from the shooting mode based on the number of user manipulation. More specifically, this operation is performed when it is possible to enter the shooting mode through a triple user manipulation. According to an embodiment of an operating program executed in a camera, a moving picture playback screen in a PMP mode is switched to a next PMP menu screen when a user clicks a pause button once, the PMP menu screen is switched to a mode change screen when the user clicks a mode button once, and then the shooting mode displaying a live view is entered when the user clicks an "OK" button once to select the shooting mode. Accordingly, the shooting mode can be entered through the triple user manipulation, and thus, this operation may be performed in a PMP playback mode displaying a PMP playback screen.

The $3^{rd}$ power control operation can be performed even when a camera is powered off. For example, even if the camera is powered off, it is possible to directly power-on the camera to perform photographing according to user manipulation. Thus, according to the $3^{rd}$ operation, the GPS is preferably, completely turned off after a satellite signal is received at least several times, e.g., at least four times. For this reason, the $3^{rd}$ power control operation can be performed for a predetermined time even if the camera is turned off.

In the $3^{rd}$ power control operation, to ensure low power consumption, the GPS receiving module 200 also intermittently operates at predetermined time intervals T3 so that power supply can be continuously 'on/off' on the time axis. The predetermined time intervals T3 are set to be longer than the predetermined time intervals T2, i.e., T3>T2>T1. For example, the predetermined time intervals T3 may be approximately 30 minute intervals.

For example, in order to apply the $0^{th}$ through $3^{rd}$ power control operations, a data table defining these operations for respective screens may be stored and a corresponding power control operation may be performed based on the data table whenever a screen change is necessary. Table 1 shows a data table defining the power control operations.

TABLE 1

| Power Control | Operating State |
| --- | --- |
| $0^{th}$ operation | shooting mode |
| $1^{st}$ operation | mode change screen, MP3 playback screen |
| $2^{nd}$ operation | power-saving mode during MP3 playback |
| $3^{rd}$ operation | moving picture playback in PMP mode, power off camera |

As an alternative, whenever a screen change is necessary, an additional arithmetic process may be performed to calculate a minimum number of user manipulation necessary to enter the shooting mode at the present stage and proceed to a power control operation corresponding to the calculated result.

Figure 4A:
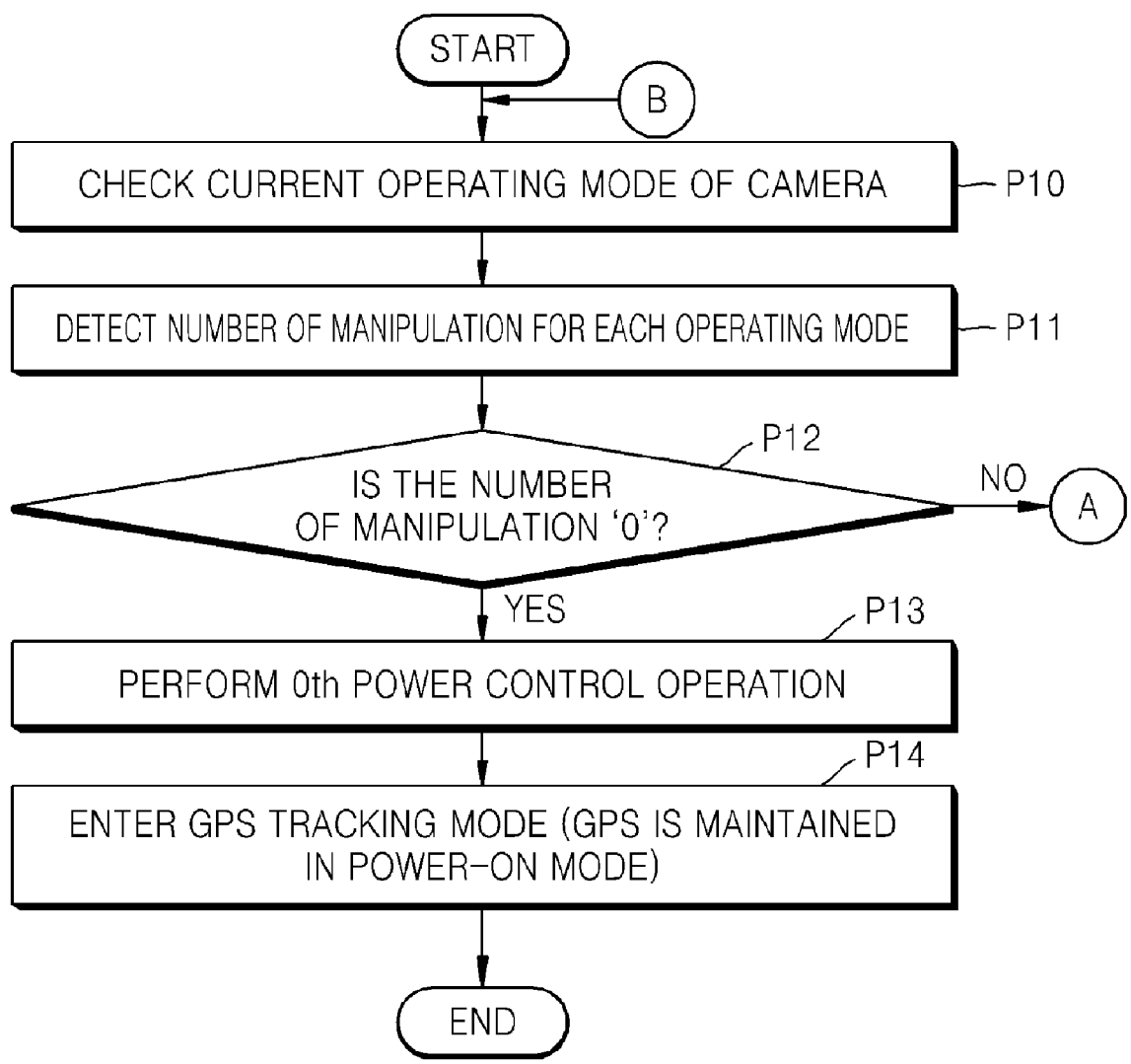
FIGS. 4A and 4B show a flowchart illustrating a GPS power control method according to an embodiment of the present invention.
Figure 4B:
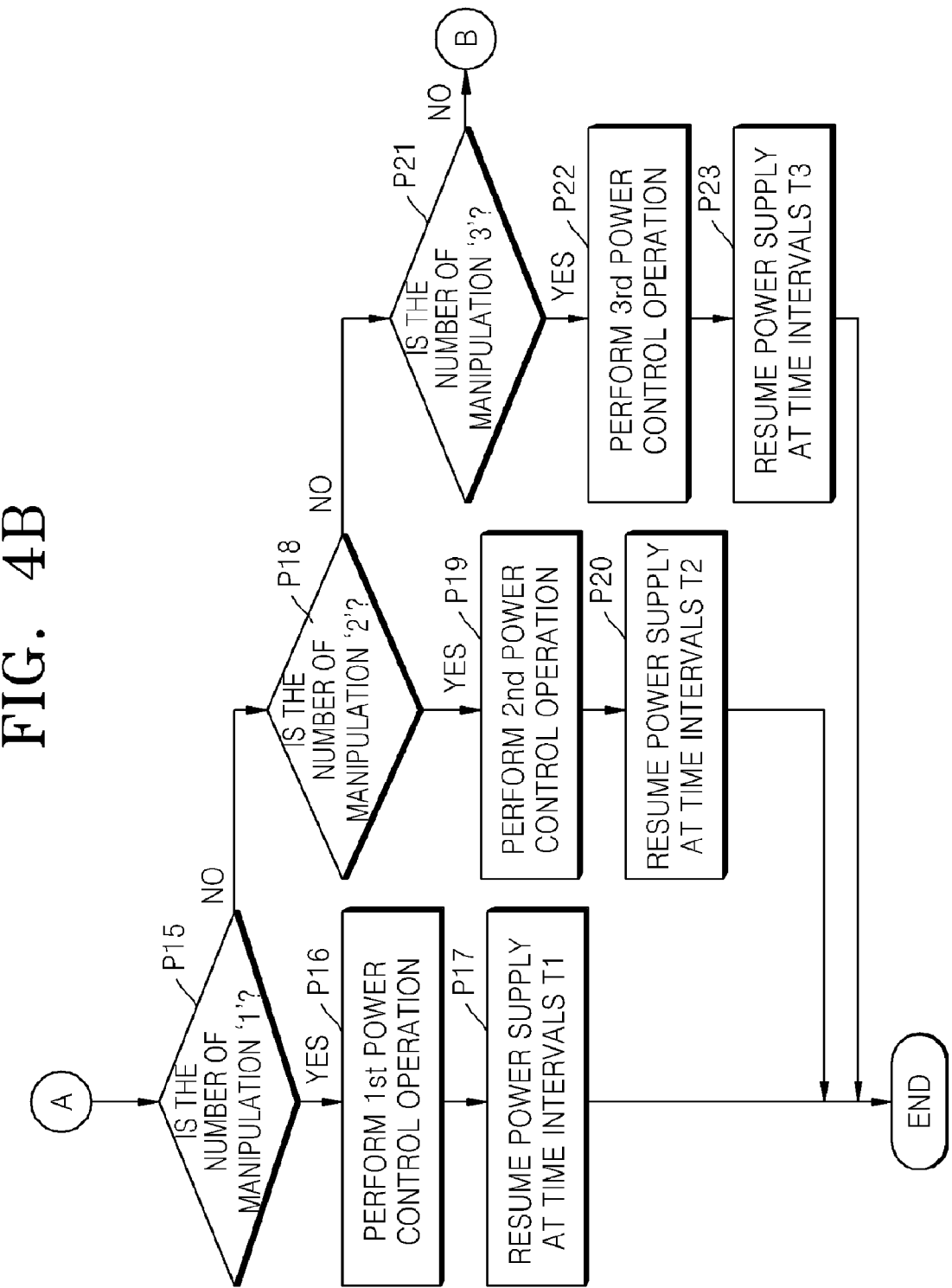
Figure 5A:
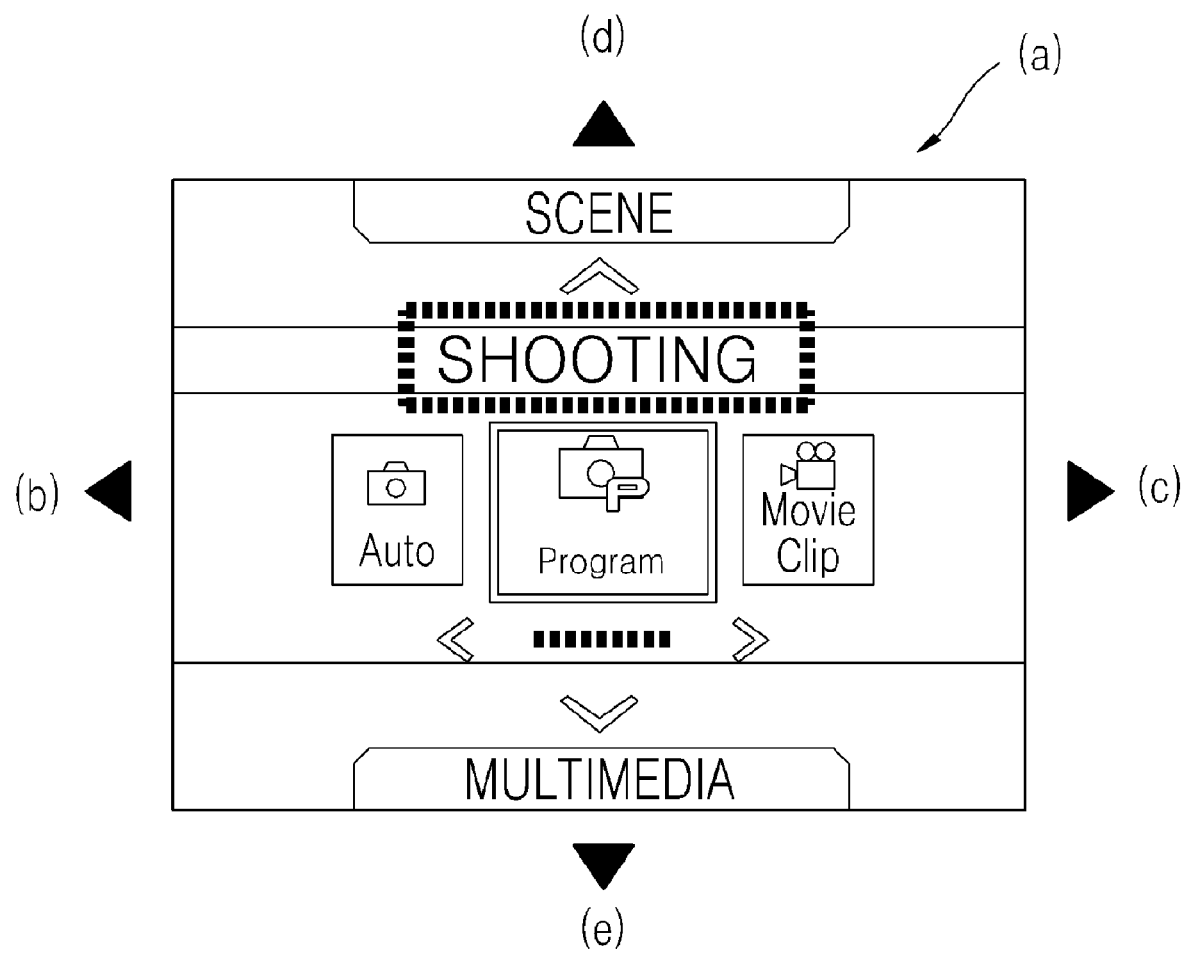
FIGS. 5A through 5E are diagrams illustrating screen switching in a mode change screen by manipulating directional buttons according to an embodiment of the present invention.
Figure 5B:
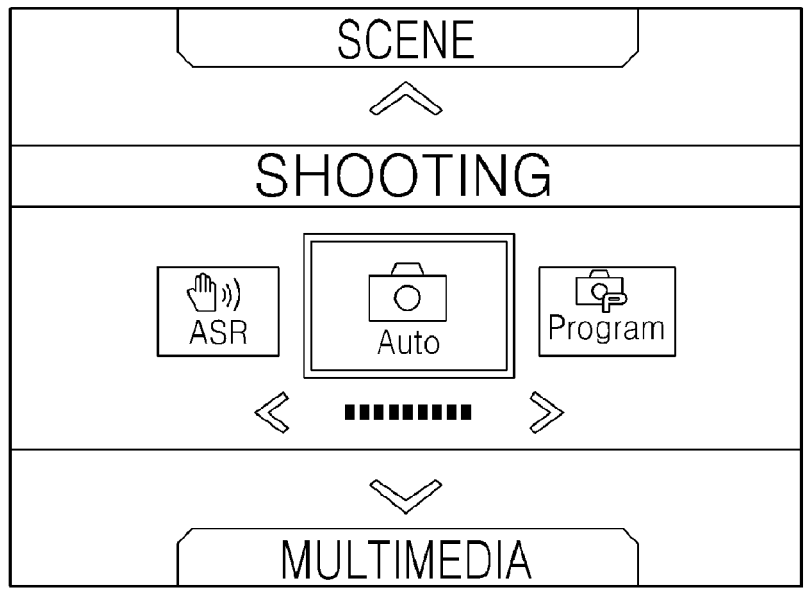
Figure 5C:
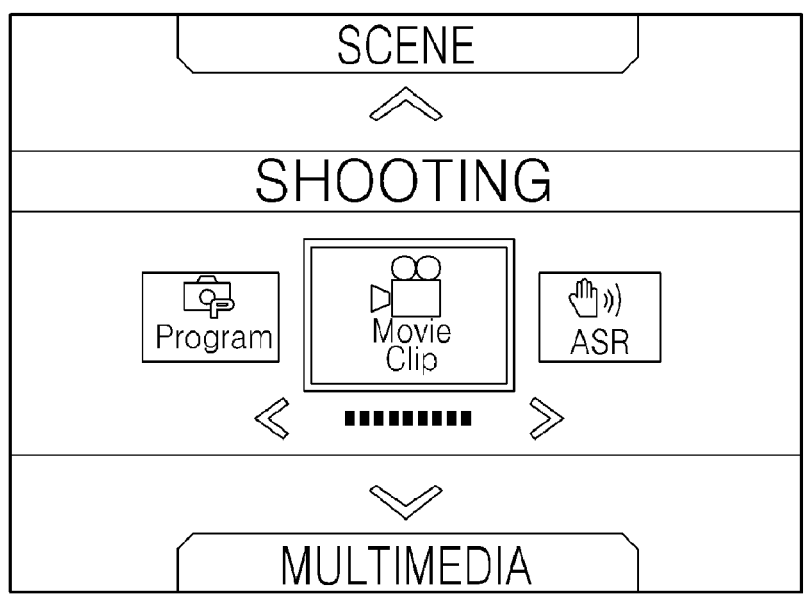
Figure 5D:
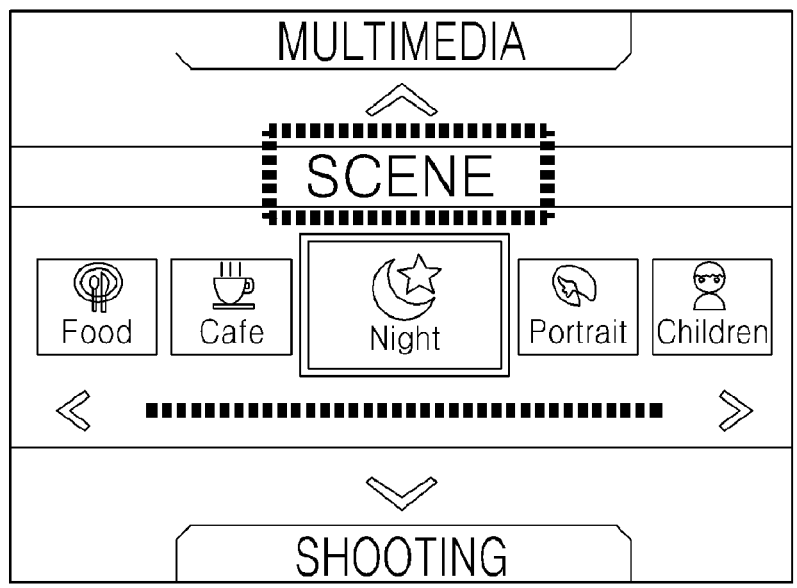
Figure 5E:
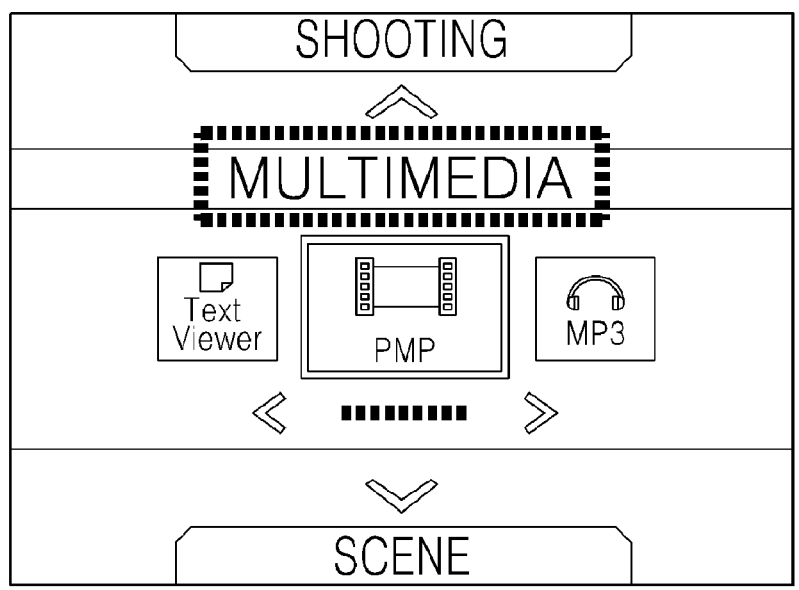

FIGS. 4A and 4B together provide a flowchart illustrating a GPS control algorithm according to an embodiment of the present invention. As illustrated in FIG. 4A, first, the current operating mode of the camera is checked (operation P10), and the number of user manipulations needed is detected by referring to a data table as shown in Table 1 according to the current operating mode (operation P11). Otherwise, the number of user manipulations necessary for entry into the shooting mode may be counted. Then, a power control operation ($0^{th}$, $1^{st}$, $2^{nd}$, $3^{rd}$) is selected according to the detected number of user manipulations (none, '1', '2', or '3'). More specifically, as illustrated in FIG. 4A, whether the number of user manipulation is '0' is determined (operation P12). If the detected number of user manipulation is '0', the $0^{th}$ operation of power control is performed (operation P13). In the $0^{th}$ operation, tracking is performed to continuously receive a satellite signal and track a satellite in orbit while a GPS receiving module is maintained in a 'power on' state (operation P14). If the detected number of user manipulation is not '0', whether the number of user manipulation is '1' is determined (operation P15) in FIG. 4B. Operation P15 is connected to operation P12 in FIG. 4A by circle A. Turning to FIG. 4B, if the number of user manipulation is '1', the $1^{st}$ operation of power control is performed (operation P16). In the $1^{st}$ power control operation, the GPS receiving module is repeatedly powered on/off and power supply is resumed at time intervals T1 (operation P17). If the detected number of user manipulation is neither '0' nor '1', whether this number is '2' is determined (operation P18). If this number is '2', the $2^{nd}$ power control operation is performed (operation P19). In the $2^{nd}$ power control operation, the GPS receiving module is repeatedly powered on/off and power supply is resumed at predetermined time intervals T2 (T2>T1) (operation P20). If the detected number of user manipulation is neither '0' nor '2', whether this number is '3' is determined (operation P21). If this number is '3', the $3^{rd}$ power control operation of power control is performed (operation P22). In the $3^{rd}$ power control operation, the GPS receiving module is repeatedly powered on/off and power supply is resumed at predetermined time intervals T3 (T3>T2>T1) (operation P23). If the detected number of user manipulation is not '0' to '3', the above operations are performed again to correct this error by restarting at operation P10 in FIG. 4A, which is connected to operation P21 by Circle B in FIGS. 4A and 4B.

The number of manipulations needed for entering the shooting mode from each individual mode executed in the camera body 100 of FIG. 1 is preferably, clearly defined. The number of manipulation being '1' means that the number of user manipulations needed for a state change of the camera body 100 is '1'. For example, the number of manipulation being '1' is defined as a button is to be clicked at least once for entering the shooting mode displaying a live view from an MP3 playback mode. However, manipulation of the directional buttons 135R, 135L, 135U, and 135D of FIG. 2 to move a cursor in one screen is not counted. The number of manipulation of the directional buttons 135R, 135L, 135U, and 135D depends on an individual user environment, cannot be objectified, and is not directly related to the state change of the camera.

FIGS. 5A, 5B, 5C, 5D, and 5E provide diagrams illustrating screen switching in a mode change screen by manipulating the directional buttons 135R, 135L, 135U, and 135D of FIG. 2 according to an embodiment of the present invention. Referring to FIGS. 5A through 5E, in order to include a plurality of menu items within one screen, a mode change screen has a varied menu configuration that is hierarchically expanded from an upper-level menu to a lower-level menu. Referring to FIGS. 5A, 5B and 5C, and 5D and 5E, upper-level menus, 'MULTIMEDIA', 'SCENE', and 'SHOOTING' are expanded in the vertical direction, and lower-level menus belonging to a selected upper-level menu, e.g., menus, 'Auto', 'Program', and 'Movie Clip' belonging to an upper-level menu 'SHOOTING' in a central screen (a), are expanded in the horizontal direction. If the 'left' button 135L or the 'right' button 135R is clicked in the screen (a), the screen (a) is switched to a screen (b) or a screen (c) and another lower-level menu belonging to the menu, 'SHOOTING' is further displayed. If the 'up' button 135U or the 'down' button 135D is clicked in the central screen (a), the screen (a) is switched to a screen (d) or (e) and the upper-level menu, 'SHOOTING' is switched to another upper-level menu, 'SCENE' or 'MULTIMEDIA'. In such a menu configuration, for entering the shooting mode, the directional buttons 135R, 135L, 135U, and 135D are clicked in order to access an upper-level menu, such as 'SCENE' or 'SHOOTING', and to select one of lower-level menu belonging to the accessed upper-level menu. However, the clicking of the directional buttons 135R, 135L, 135U, and 135D is not counted as user manipulation since the clicking does not actually change the operating state of the camera but is just intermediate manipulation for menu selection.

Figure 6:
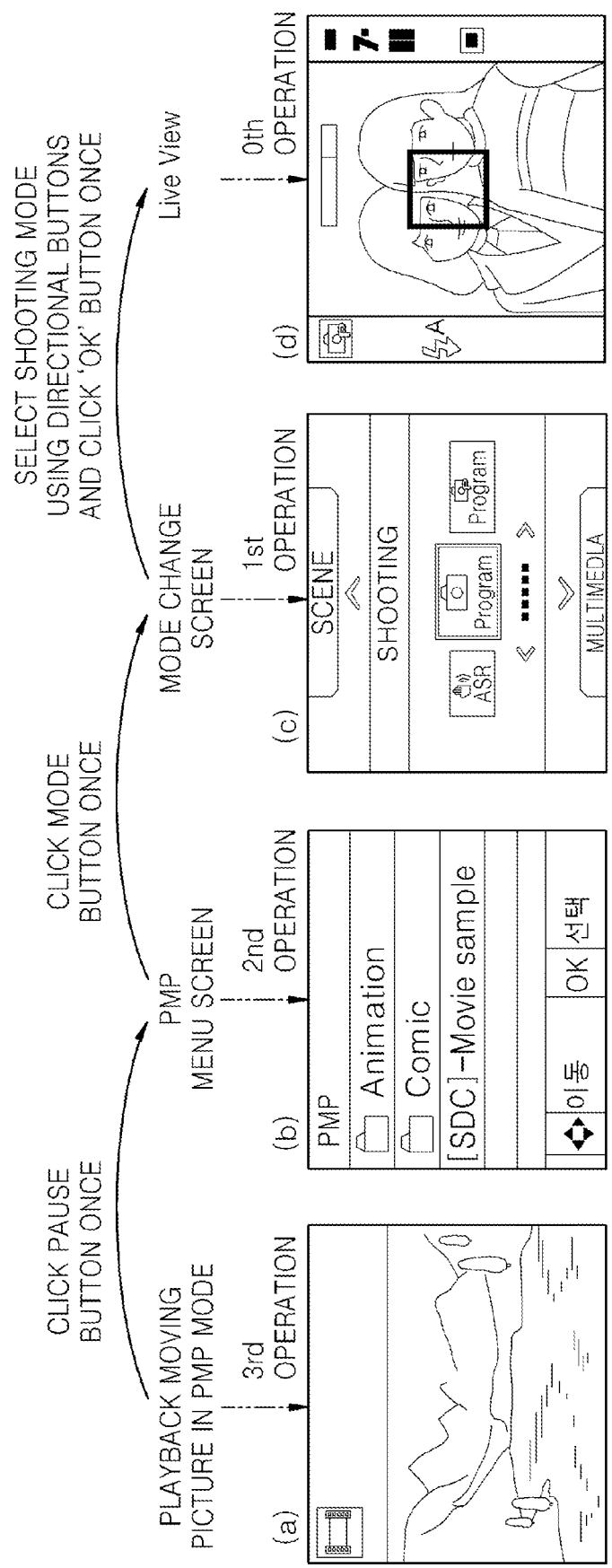
FIG. 6 illustrates sequential screen switching related to counting the number of user manipulation for entering a shooting mode in a moving picture playback screen, according to an embodiment of the present invention.

FIG. 6 illustrates sequential screen switching related to counting the number of user manipulations for entering a shooting mode displaying a live view in a moving picture playback screen, according to an embodiment of the present invention. Referring to (a) of FIG. 6, if a pause button is clicked once in a playback screen in which a moving picture is played back in a PMP mode, the playback screen is switched to a PMP mode screen illustrated in (b) of FIG. 6. Next, if a mode button (M button) is clicked in the PMP mode screen, the PMP mode screen is switched to a mode change screen illustrated in (c) of FIG. 6. Next, if a 'SCENE' item for capturing a still image or a 'SHOOTING' item for capturing a moving image is selected from among various menu items displayed in the mode change screen, the mode change screen is switched to the shooting screen displaying a live view as illustrated in (d) of FIG. 6. In conclusion, the above $3^{rd}$ operation may be performed in a playback screen displaying a moving picture since the playback screen can be switched to the shooting mode through a triple manipulation, and a GPS receiving module may be intermittently powered on/off at time intervals T3, e.g., at 30 minute intervals.

Figure 7A:
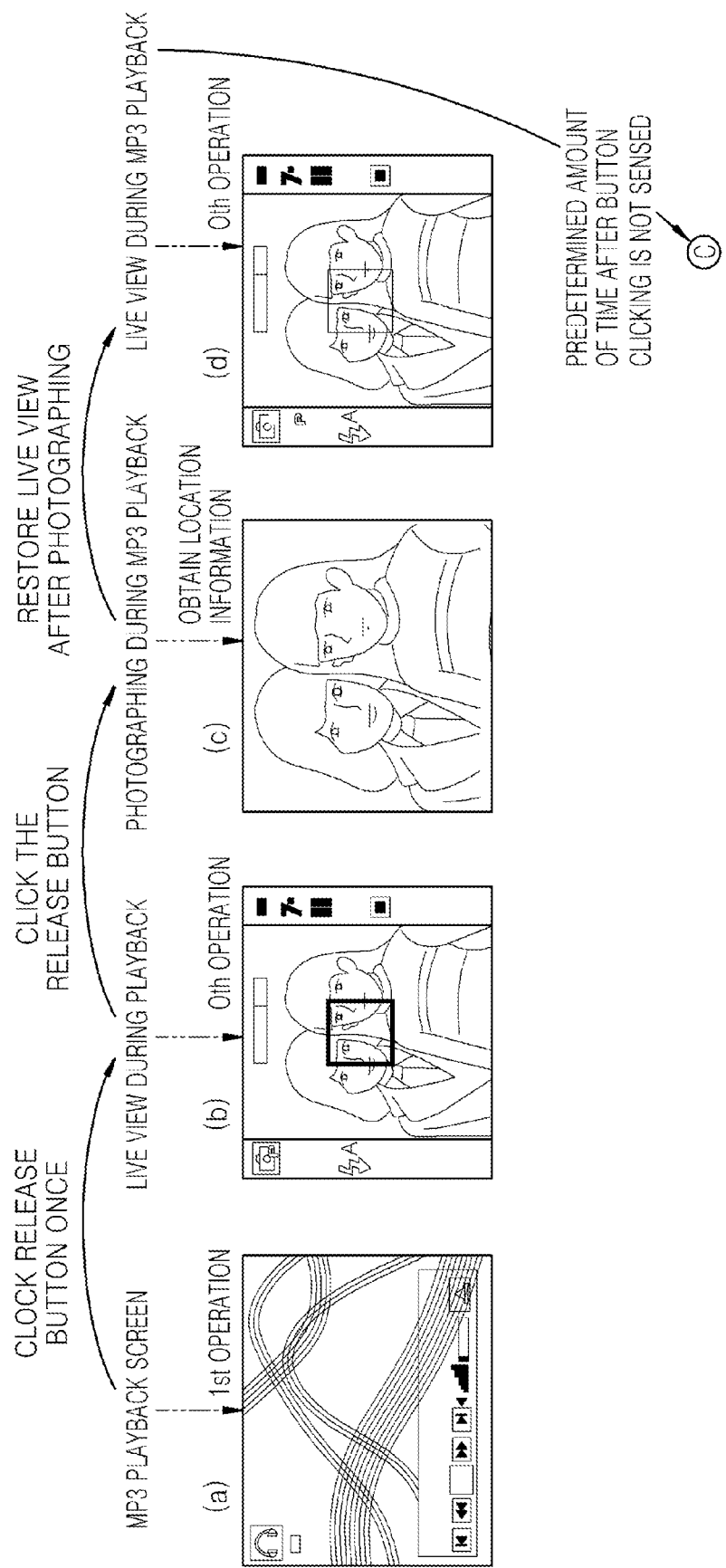
FIGS. 7A and 7B are screen shots illustrating sequential screen switching related to counting the number of manipulation for entering a shooting mode from an MP3 playback screen, according to an embodiment of the present invention.
Figure 7B:
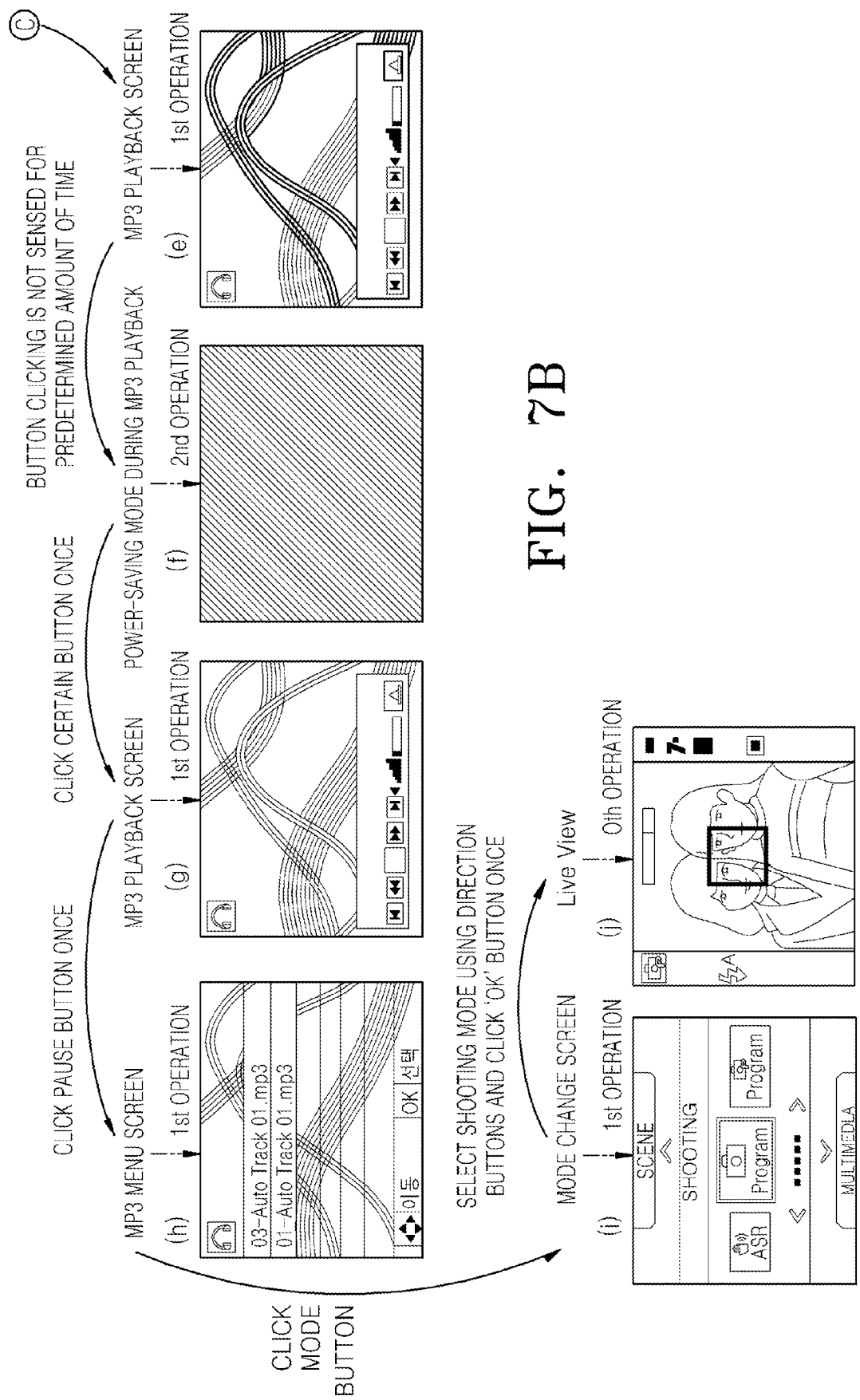

FIGS. 7A and 7B illustrate sequential screen switching related to counting the number of manipulations for entering a shooting mode from an MP3 playback screen, according to an embodiment of the present invention. If a release button is clicked once while displaying an MP3 playback screen illustrated in (a) of FIG. 7A, it is possible to directly enter the shooting mode displaying a live view as illustrated in (b) of FIG. 7A, and thus, the $1^{st}$ power control operation may be performed when the MP3 playback screen is displayed and the GPS receiving module 200 of FIG. 1 may be intermittently powered on/off at time intervals T1, e.g., 5 minute intervals. In the shooting mode, a shooting event may be generated as soon as a user manipulates a shutter, and thus, the $0^{th}$ power control operation may be performed and the GPS receiving module 200 is always powered on in order to prepare for photographing. When photographing starts, the GPS receiving module 200 rapidly obtains GPS location information by using navigation data previously received from a satellite, as illustrated in (c) of FIG. 7A, and stores the obtained location information to be attached to a captured image. Even after the photographing, if the shooting mode does not end, a satellite signal is continuously received according to the $0^{th}$ operation as illustrated in (d) of FIG. 7A. Then, if an additional button manipulation is not sensed for a predetermined standby period, e.g., for 10 minutes, the original MP3 playback screen is restored according to an operating program as illustrated in (e) of FIG. 7B. In this case, it is possible to enter the shooting mode by clicking the release button once, and thus, the $1^{st}$ power control operation is performed and the GPS receiving module 200 is intermittently powered on/off at the time intervals T1, e.g., 5 minute intervals. If an additional button manipulation is not sensed for a predetermined standby period, e.g., 20 seconds, while displaying the button MP3 playback screen, a power-saving mode that switches off a backlight of the playback screen is entered according to an operating program as illustrated in (f) of FIG. 7B. The power-saving mode is released and the MP3 playback screen is restored by clicking a certain button once, as illustrated in (g) of FIG. 7B. If a user clicks a pause button once, the MP3 playback screen is switched to an MP3 menu screen as illustrated in (h) of FIG. 7B. Next, if a mode button (M button) is clicked once in the MP3 menu screen, the MP3 menu screen may be switched to a mode change screen as illustrated in (i) of FIG. 7B. Then, if a 'SCENE' item or a 'SHOOTING' item related to the shooting mode is selected, the shooting mode may be entered as illustrated in (j) of FIG. 7B.

Here, in the MP3 playback screen illustrated in (e) and (g) of FIG. 7B, the MP3 playback screen can be directly switched to the shooting mode by clicking the release button once, and thus, the $1^{st}$ power control operation may be performed. In the power-saving mode illustrated in (f) of FIG. 7B, the power-saving mode can be switched to the shooting mode through a double user manipulation including clicking a certain button once and clicking the release button once. Thus, the $2^{nd}$ power control operation may be performed in the power-saving mode. In the MP3 menu screen illustrated in (h) of FIG. 7B and the mode change screen illustrated in (i) of FIG. FIG. 7B, they can be switched to the shooting mode by either clicking the release button once or selecting a 'shooting' item (manipulation of directional buttons is not counted in this case) and then clicking an 'OK' button once. Accordingly, the clicking is considered as a single user manipulation and thus the $1^{st}$ power control operation may be performed.

In a digital camera and a method of controlling the same according to the above embodiments of the present invention, power supplied to a GPS is adaptively controlled according to a current operating mode, thereby saving power necessary for continuously calculating GPS information that is not directly related to the photographing location. Also, a standby state of a GPS is maintained by applying multi-stage power control according to the number of user manipulation necessary for mode switching between a current operating mode and a shooting mode, because the precision of information is achieved by obtaining GPS information in real time as soon as a user manipulates a shutter, thereby promptly calculating GPS information in response to a shooting event and reducing a standby period of time.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A digital camera comprising:
a camera body capturing an image of a subject;
a GPS (global positioning system) receiving module calculating GPS information regarding a photographing location in response to a photographing signal from the camera body; and
a digital signal processor performing multi-stage power control operations on the GPS receiving module according to a minimum number of manipulations necessary for entering a shooting mode from a current operating mode, wherein
a $0^{th}$ power control operation is performed on the GPS receiving module in the shooting mode,
a $1^{st}$ power control operation is performed on the GPS receiving module in an operating mode requiring that the number of manipulations is '1', and
a $2^{nd}$ power control operation is performed on the GPS receiving module in an operating mode requiring that the number of manipulations is '2'.

2. The digital camera of claim 1, wherein the GPS receiving module is maintained in a power-on state in the $0^{th}$ power control operation, and
the GPS receiving module is alternately powered on and off in the $1^{st}$ and $2^{nd}$ power control operations, where the relationship between time intervals T1 and T2 at which power supply is respectively resumed in the $1^{st}$ and $2^{nd}$ power control operations satisfies T1<T2.

3. The digital camera of claim 1, wherein
a $3^{rd}$ power control operation is performed on the GPS receiving module in an operating mode requiring that the number of manipulations is '3'.

4. The digital camera of claim 3, wherein the GPS receiving module is maintained in a power-on state in the $0^{th}$ power control operation, and
the GPS receiving module is alternately powered on and off in the $1^{st}$ through $3^{rd}$ power control operations, where the relationship between time intervals T1, T2 and T3 at which power supply is respectively resumed in the $1^{st}$ through $3^{rd}$ power control operations satisfies T1<T2<T3.

5. The digital camera of claim 1, wherein the GPS receiving module comprises a memory storing received navigation data, and reduces a standby period of time to receive navigation data by loading last received navigation data when power supply is resumed.

6. The digital camera of claim 5, wherein the GPS receiving module is booting by one of hot booting, warm booting, and cold booting according to the amount of time that lapses after navigation data is last received.

7. The digital camera of claim 6, wherein in the power control operations, time intervals at which power supply to the GPS receiving module resumes are set to be short enough to perform the hot booting.

8. The digital camera of claim 5, wherein, if the memory is a volatile memory in which recorded information is lost when power supply is discontinued, power supply is maintained regardless of GPS power control.

9. The digital camera of claim 1, wherein the number of manipulations is obtained by referring to a data table recording the relationships between an individual operating mode and the number of manipulations.

10. The digital camera of claim 1, wherein a manipulation necessary to change the state of the camera is counted as the number of manipulations, and manipulation of directional buttons is not counted.

11. A method of controlling a digital camera including a camera body capturing an image of a subject and a GPS (global positioning system) receiving unit calculating GPS information regarding a photographing location in response to a photographing signal from the camera body, the method comprising:
checking a current operating mode executed in the camera body;
detecting a minimum number of manipulations necessary for entering a shooting mode from the current operating mode; and
performing multi-stage power control operations on the GPS receiving module according to the number of manipulations, wherein
on the GPS receiving module, a $0^{th}$ power control operation is performed in the shooting mode,
a $1^{st}$ power control operation is performed in an operating mode requiring that the number of manipulations is '1', and
a $2^{nd}$ power control operation is performed in an operating mode requiring that the number of manipulations is '2'.

12. The method of claim 11, wherein
a $3^{rd}$ power control operation is performed in an operating mode requiring that the number of be manipulations is '3'.

13. The method of claim 12, wherein the operating mode requiring that the number of be manipulations is '1' comprises an MP3 playback mode and a mode change mode,
the operating mode requiring that the number of manipulations is '2' comprises an MP3 power-saving mode, and the operating mode requiring that the number of manipulations is '3' comprises a PMP (personal multimedia player) playback mode and power-off state of the camera body.

14. The method of claim 12, wherein the GPS receiving module is maintained in a power-on state in the $0^{th}$ power control operation, and the GPS receiving module is alternately powered on and off in the $1^{st}$ through $3^{rd}$ power control operations, where the relationship between time intervals T1, T2 and T3 at which power supply is respectively resumed in the $1^{st}$ through $3^{rd}$ power control operations satisfies T1<T2<T3.

15. The method of claim 11, wherein the GPS receiving module comprises a memory storing received navigation data, and reduces a standby period of time to receive navigation data by loading last received navigation data when power supply is resumed.

16. The method of claim 15, wherein the GPS receiving module is booting by one of hot booting, warm booting, and cold booting according to the amount of time that lapses after navigation data is lastly received.

17. The method of claim 16, wherein in the power control operations, time intervals at which power supply to the GPS receiving module resumes are set to be short enough to perform the hot booting.

18. The method of claim 11, wherein the detecting of a minimum number of manipulations necessary comprises referring to a data table recording the relationships between an individual operating mode and the number of manipulations.

* * * * *